Patented Mar. 4, 1952

2,587,577

UNITED STATES PATENT OFFICE 2,587,577

PRODUCTION OF ARYLINDANES

Vladimir N. Ipatieff and Herman Pines, Chicago, Ill., assignors to Universal Oil Products Company, Chicago, Ill., a corporation of Delaware No Drawing. Application March 27, 1948, Serial No. 17,588

18 Claims. (Cl. 260—668)

This application is a continuation-in-part of our co-pending application Serial Number 788,644, filed November 28, 1947, now Patent No. 2,526,897, October 24, 1950, which in turn is a continuation-in-part of our co-pending application Serial Number 619,430, filed September 29, 1945, now abandoned.

This invention relates to a process for producing aryl indan hydrocarbons and particularly for producing phenyl indan hydrocarbons and alkylated or cycloalkylated phenyl indan hydrocarbons.

An object of this invention is the production of an aryl indan hydrocarbon.

Another object of this invention is the production of an alkylated aryl indan hydrocarbon.

A further object of this invention is the production of an alkylatable phenyl indan.

One specific embodiment of this invention relates to a process for producing an indan hydrocarbon which comprises reacting at hydrogen transfer conditions in the presence of an acid-acting catalyst a branched-chain alcohol and a para-disubstituted benzene hydrocarbon having as one substituent a hydrocarbon group containing only one hydrogen atom joined to the carbon atom combined with the benzene ring.

Another embodiment of this invention relates to a process for producing an indan hydrocarbon which comprises reacting in the presence of an acid-acting catalyst a terpenic alcohol and a para-disubstituted benzene hydrocarbon having as one substituent a group containing only one hydrogen atom joined to the carbon atom combined with the benzene ring.

A further embodiment of this invention relates to a process for producing aryl indan hydrocarbons which comprises reacting at hydrogen transfer conditions in the presence of an acid-acting catalyst a branched chain alcohol and a benzene hydrocarbon of the formula

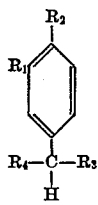

wherein $R_1$ is selected from the group consisting of a hydrogen atom, an alkyl radical, a cycloalkalkyl radical, and a cycloalkyl radical, and each of $R_2$, $R_3$ and $R_4$ is selected from the group consisting of an alkyl radical, a cycloalkalkyl radical, and a cycloalkyl radical. The term "cycloalkalkyl radical" has reference to an alkyl group in which one of the hydrogen atoms has been substituted by a cycloalkyl group.

We have developed a method for producing indan hydrocarbons by effecting a hydrogen transfer reaction between a branched chain alcohol and an aromatic hydrocarbon containing at least two and not more than five hydrocarbon substituents with two substituents in para position. One of said para-substituents contains at least three carbon atoms and also has a hydrogen atom combined with the carbon atom that is joined to the aromatic ring. The reaction is illustrated by the following equation wherein $x$ is selected from zero and the small even numbers 2, 4, etc.

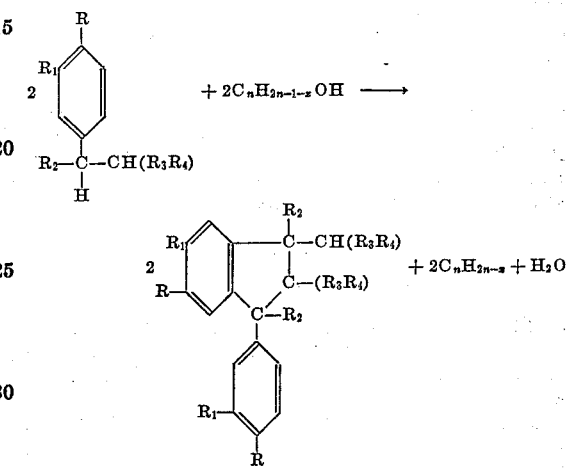

Similarly, the production of 1,3,3,6-tetra-methyl-1-p-tolylindan from the reaction of p-cymene with terpineol is indicated by the equation:

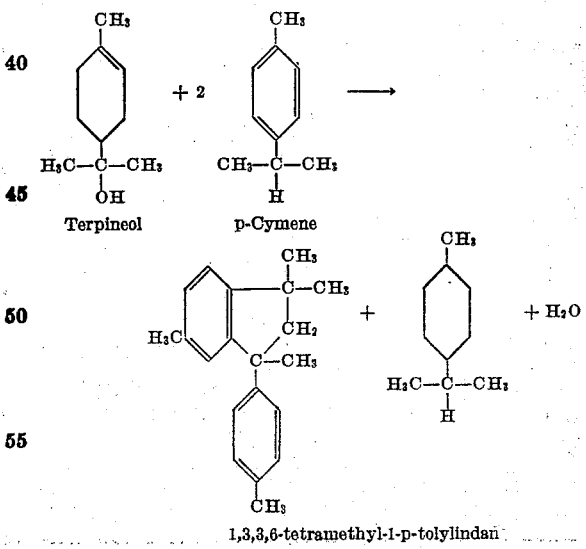

1,3,3,6-tetramethyl-1-p-tolylindan

The aromatic compound used in this synthesis of an indan contains at least one para-arrangement of hydrocarbon group substituents in order to take part in this hydrogen transfer reaction. Also one of the substituents in the para-arrangement must have only one hydrogen atom combined with the carbon atom attached to the benzene ring. Accordingly, this hydrocarbon substituent which contains the tertiary hydrogen atom also contains at least three carbon atoms. Such aromatic hydrocarbons which are useful as starting materials for the process have the structures represented by the formula:

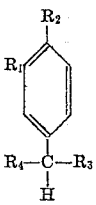

wherein R represents a member selected from the group consisting of a hydrogen atom, an alkyl radical, a cycloalkalkyl radical, and a cycloalkyl radical, and each of $R_2$, $R_3$ and $R_4$ is selected from the group consisting of an alkyl radical, a cycloalkalkyl radical, a cycloalkyl radical, and a bicycloalkyl radical. The combination of the different groups should be balanced so as to avoid steric hindrance. Also aromatic hydrocarbons and particularly benzene hydrocarbons containing more than three hydrocarbon substituent groups may also be present in a starting material provided that such a hydrocarbon has a replaceable hydrogen atom combined with a nuclear carbon atom adjacent to the carbon atom which is combined with the group:

Such aromatic starting materials include p-cymene, 1,2-dimethyl-4-isopropylbenzene, 2,4-diisopropyltoluene, 4-isopropyl-2-cyclohexyltoluene, etc.

The alcohols utilizable in this process have a branched chain of carbon atoms, and include alkanols, alkenols, cycloalkanols, cycloalkenols, and the like. Terpenic alcohols which comprise an unsaturated ring such as terpineol are particularly useful in this process.

The process as herein described is carried out in the presence of an acid-acting catalyst at conditions necessary for the hydrogen transfer reaction. Suitable acid-acting catalysts include mineral acids, such as sulfuric acid, chlorosulfonic acid, fluorosulfonic acid, hydrogen fluoride, hydroxyborofluoric acids, fluorophosphoric acids, phosphoric acids; and Friedel-Crafts halide catalysts, particularly aluminum chloride, aluminum bromide, ferric chloride, zirconium chloride, boron fluoride. Since in some cases Friedel-Crafts catalysts may cause an alkyl migration within the aromatic ring before the hydrogen transfer reaction occurs, it is sometimes advantageous to use Friedel-Crafts complexes, such as etherate, alcoholate, etc. for this reaction.

Phosphoric acid catalysts comprise orthophosphoric acid and also polyphosphoric acids such as pyrophosphoric acid, triphosphoric acid, and tetraphosphoric acid. Under certain conditions of operation various acid-acting, oxide-type catalysts may be used which include activated clays, silica-alumina composites, and other silica-containing materials which are generally utilizable as catalysts for hydrocarbon cracking.

The operating conditions used in the process are dependent upon the nature of the hydrocarbons and branched chain alcohols being treated and also upon the catalysts employed. When utilizing strong mineral acids, such as hydrogen fluoride, sulfuric acid, fluorosulfonic acid, chlorosulfonic acid, and the like, and also Friedel-Crafts metal halides promoted by a hydrogen halide such as hydrogen chloride, the process is carried out at a temperature of from about $-30°$ to about $100°$ C., and at a pressure up to about 100 atmospheres. However, in the presence of hydrogen fluoride, sulfuric acid, and aluminum chloride catalysts the preferred operating temperature is generally from about $0°$ to about $50°$ C., while in contact with ferric chloride catalyst the preferred operating temperature is from about $50°$ to about $100°$ C. Silica-alumina and other synthetic oxide catalysts and clays are generally used at a temperature of from about $200°$ to about $400°$ C., and at a superatmospheric pressure generally not in excess of about 100 atmospheres.

Our process is carried out in either batch or continuous type of operation. In batch type operation, the usual procedure consists in placing a mineral acid or Friedel-Crafts catalyst and a portion, generally about 50%, of the aromatic hydrocarbon in a reactor provided with a mechanically driven stirrer, cooling these materials to a temperature of from about $0°$ to about $10°$ C., and adding therewith with stirring a solution of the branched chain alcohol in the remainder of the aromatic hydrocarbon. The reaction mixture is then separated and the product is washed, dried, and distilled to separate therefrom the indan hydrocarbons. Unconverted aromatic hydrocarbons recovered in this distillation are utilizable in the further operation of the process.

The process is also carried out in a continuous manner by passing the aromatic hydrocarbon and branched chain alcohol through a suitable reactor in which they are contacted in the presence of the catalyst, the latter either as a liquid or as a solid, depending upon the catalyst employed in the process. When using mineral acid catalysts such as sulfuric acid, chlorosulfonic acid, or hydrogen fluoride, this catalytic material is introduced continuously to the reactor which is provided with suitable mixing means and the resultant product is then separated into a hydrocarbon layer and a catalyst layer, the latter being returned to further use in the process while the hydrocarbon layer is washed, dried, and distilled as hereinabove set forth. When a solid catalyst such as silica-alumina, clay, or a supported Friedel-Crafts type catalyst is used as a fixed bed in the reactor and the aromatic and cyclo-olefinic hydrocarbons are passed therethrough, the resultant hydrocarbon product requires no washing and drying treatment and the desired indan hydrocarbons are separated therefrom by suitable means such as by fractional distillation.

In order to obtain relatively high yields of indan hydrocarbons by our process, it is necessary to use rather carefully selected hydrocarbon fractions as charging stocks. As already indicated herein, only certain types of aromatic hydrocarbons, namely those containing particular substituents are utilizable as starting materials to produce indan-type hydrocarbons. Thus isopropyltoluene, s-butyltoluene, para-diisopropylbenzene and others react readily with branched chain alcohols to form an indan hydrocarbon and a saturated hydrocarbon, the latter having substantially the same carbon skeleton as that of the alcohol charged to the process. An aromatic hydrocarbon which does not contain the aforementioned disubstitution in para position does not react with a branched chain alcohol to give the desired hydrogen transfer reaction. Also an alcohol which does not have a branched chain of carbon atoms acts as an alkylating agent for the aromatic hydrocarbon also charged to the process. Accordingly, in order to obtain hydrogen transfer rather than alkylation, it is necessay to use a branched chain alcohol together with a disubstituted benzene hydrocarbon in which the substituents are in para positions and one of said substituents comprises an isopropyl group or other hydrocarbon group in which a tertiary hydrogen atom is combined with the carbon atom adjacent to the aromatic nucleus.

The indans formed in this process may be sulfonated and hydrolyzed to form phenols or they may be nitrated and reduced to the corresponding amines. The amines may then be diazotized and converted into phenols which may be useful as inhibitors. The sulfonation product of an indan containing a long alkyl, cycloalkyl or cycloalkyl group may also be converted into a detergent. Some of the indan hydrocarbons formed in the process are also useful as additives in lubricating oils.

The following example is given to illustrate the character of results obtained by the use of specific embodiments of the present invention, although the data presented are not introduced with the intention of unduly restricting the generally broad scope of the invention.

150 grams of terpineol and 300 grams of p-cymene were reacted in the presence of 115 grams of liquid hydrogen fluoride at 0° C. in an autoclave equipped with a mechanically driven stirrer. The resultant reaction product was separated from the hydrogen fluoride catalyst layer and the product was then washed, dried, and distilled. Fractional distillation of 431 grams of this product separated it into 216 grams of a fraction boiling from 170° to 180° C. having a refractive index, $n_D^{20}$, of 1.4825, and containing 83% of p-cymene and 17% of p-menthane; 110 grams of a fraction boiling from 326° to 334° C., having a refractive index, $n_D^{20}$, of 1.5360, and containing 30% of 1,3,3,6-tetramethyl-1-p-tolylindan, and 26 grams of a fraction boiling from 334° to 350° C. having a refractive index, $n_D^{20}$, of 1.5384, and containing 70% of 1,3,3,6-tetramethyl-1-p-tolylindan.

We claim as our invention:

1. A process for producing an indan hydrocarbon which comprises reacting at hydrogen transfer conditions in the presence of an acid-acting catalyst a branched-chain alcohol and a para-disubstituted benzene hydrocarbon having as one substituent a saturated hydrocarbon group containing only one hydrogen atom joined to the carbon atom combined with the benzene ring.

2. A process for producing an indan hydrocarbon which comprises reacting in the presence of an acid-acting catalyst a branched-chain cycloalkanol and a para-disubstituted benzene hydrocarbon having as one substituent a saturated hydrocarbon group containing only one hydrogen atom joined to the carbon atom combined with the benzene ring.

3. A process for producing an aryl indan hydrocarbon which comprises reacting at hydrogen transfer conditions in the presence of an acid-acting catalyst a branched chain alcohol and a benzene hydrocarbon of the formula

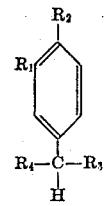

wherein $R_1$ is selected from the group consisting of a hydrogen atom, an alkyl radical, a cycloalkyl radical, and a cycloalkalkyl radical, and each of $R_2$, $R_3$ and $R_4$ is selected from the group consisting of an alkyl radical, a cycloalkyl radical, a cycloalkalkyl radical, and a bicycloalkyl radical.

4. A process for producing an indan hydrocarbon which comprises reacting in the presence of a mineral acid catalyst at a temperature of from about —30° to about 100° C., a branched chain alcohol and a para-disubstituted benzene hydrocarbon having as one substituent a saturated hydrocarbon group containing at least three carbon atoms and having a hydrogen atom joined to the carbon atom combined with the benzene ring.

5. A process for producing an indan hydrocarbon which comprises reacting in the presence of a mineral acid catalyst at a temperature of from about —30° to about 100° C., a branched chain alkanol and a para-disubstituted benzene hydrocarbon having as one substituent a saturated hydrocarbon group containing at least three carbon atoms and having a hydrogen atom joined to the carbon atom combined with the benzene ring.

6. A process for producing an indan hydrocarbon which comprises reacting in the presence of a mineral acid catalyst at a temperature of from about —30° to about 100° C., a branched chain alkenol and a para-disubstituted benzene hydrocarbon having as one substituent a saturated hydrocarbon group containing at least three carbon atoms and having a hydrogen atom joined to the carbon atom combined with the benzene ring.

7. A process for producing an indan hydrocarbon which comprises reacting in the presence of a mineral acid catalyst at a temperature of from about —30° to about 100° C., a terpenic alcohol and a para-disubstituted benzene hydrocarbon having as one substituent a saturated hydrocarbon group containing at least three carbon atoms and having a hydrogen atom joined to the carbon atom combined with the benzene ring.

8. A process for producing an indan hydrocarbon which comprises reacting in the presence of a sulfuric acid catalyst at a temperature of from about 0° to about 50° C., a branched-chain alcohol and a para-disubstituted benzene hydrocarbon having as one substituent a saturated hydrocarbon group containing at least three carbon atoms and having a hydrogen atom joined to the carbon atom combined with the benzene ring.

9. A process for producing an indan hydrocarbon which comprises reacting in the presence of a hydrogen fluoride catalyst at a temperature of from about 0° to about 50° C. a branched-chain alcohol and a para-disubstituted benzene hydrocarbon having as one substituent a saturated hydrocarbon group containing at least three carbon atoms and having a hydrogen atom joined to the carbon atom combined with the benzene ring.

10. A process for producing an indan hydrocarbon which comprises reacting in the presence of a hydrogen fluoride catalyst at a temperature of from about 0° to about 50° C. a branched-chain alkanol and a para-disubstituted benzene hydrocarbon having as one substituent a saturated hydrocarbon group containing at least three carbon atoms and having a hydrogen atom joined to the carbon atom combined with the benzene ring.

11. A process for producing an indan hydrocarbon which comprises reacting in the presence of a hydrogen fluoride catalyst at a temperature of from about 0° to about 50° C. a terpenic alcohol and a para-disubstituted benzene hydrocarbon having as one substituent a saturated hydrocarbon group containing at least three carbon atoms and having a hydrogen atom joined to the carbon atom combined with the benzene ring.

12. A process for producing 1,3,3,6-tetramethyl-1-p-tolylindan which comprises reacting a branched-chain alcohol and para-cymene in the presence of an acid-acting catalyst at hydrogen transfer conditions.

13. A process for producing 1,3,3,6-tetramethyl-1-p-tolylindan which comprises reacting a branched-chain alcohol and para-cymene in the presence of a mineral acid catalyst at a temperature of from about −30° to about 100° C.

14. A process for producing 1,3,3,6-tetramethyl-1-p-tolylindan which comprises reacting a branched-chain alcohol and para-cymene in the presence of a sulfuric acid catalyst at a temperature of from about 0° to about 50° C.

15. A process for producing 1,3,3,6-tetramethyl-1-p-tolylindan which comprises reacting a branched-chain alcohol and para-cymene in the presence of a hydrogen fluoride catalyst at a temperature of from about 0° to about 50° C.

16. A process for producing 1,3,3,6-tetramethyl-1-p-tolylindan which comprises reacting para-cymene and a terpenic alcohol in the presence of a mineral acid catalyst at a temperature of from about −30° to about 100° C.

17. A process for producing 1,3,3,6-tetramethyl-1-p-tolylindan which comprises reacting para-cymene and a terpenic alcohol in the presence of a sulfuric acid catalyst at a temperature of from about −30° to about 100° C.

18. A process for producing 1,3,3,6-tetramethyl-1-p-tolylindan which comprises reacting para-cymene and a terpenic alcohol in the presence of a hydrogen fluoride catalyst at a temperature of from about −30° to about 100° C.

VLADIMIR N. IPATIEFF.
HERMAN PINES.

REFERENCES CITED

The following references are of record in the file of this patent:

Puranen: Chem. Abst., vol. 27 (1933), pages 5062–3 (2 pages).

Simons: "Potential Use of Hydrogen Fluoride . . .," Ind. Eng. Chem., vol. 32, pages 178–183 (February, 1940) (6 pages; reliance is placed on disclosure in page 181).